Sept. 5, 1967 T. A. F. X. McCARTHY 3,340,061
LENS STOP
Filed Jan. 23, 1964 2 Sheets-Sheet 1
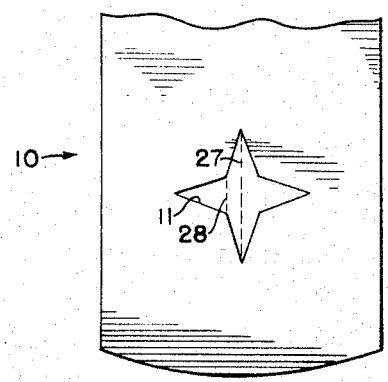
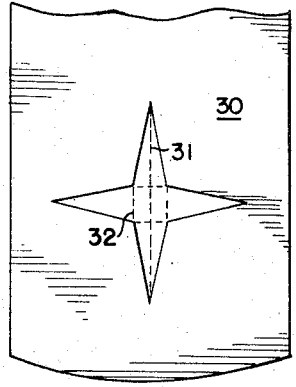
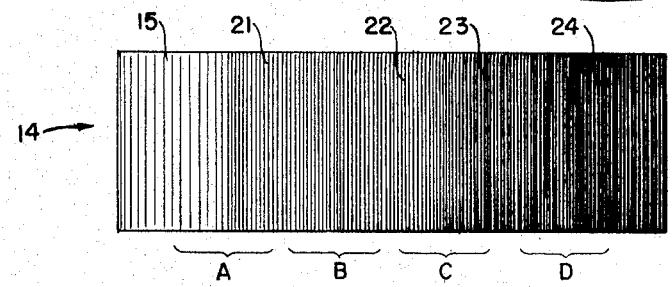
INVENTOR.
THOMAS A.F.X. McCARTHY
BY
Edward B. Hunter
ATTORNEY

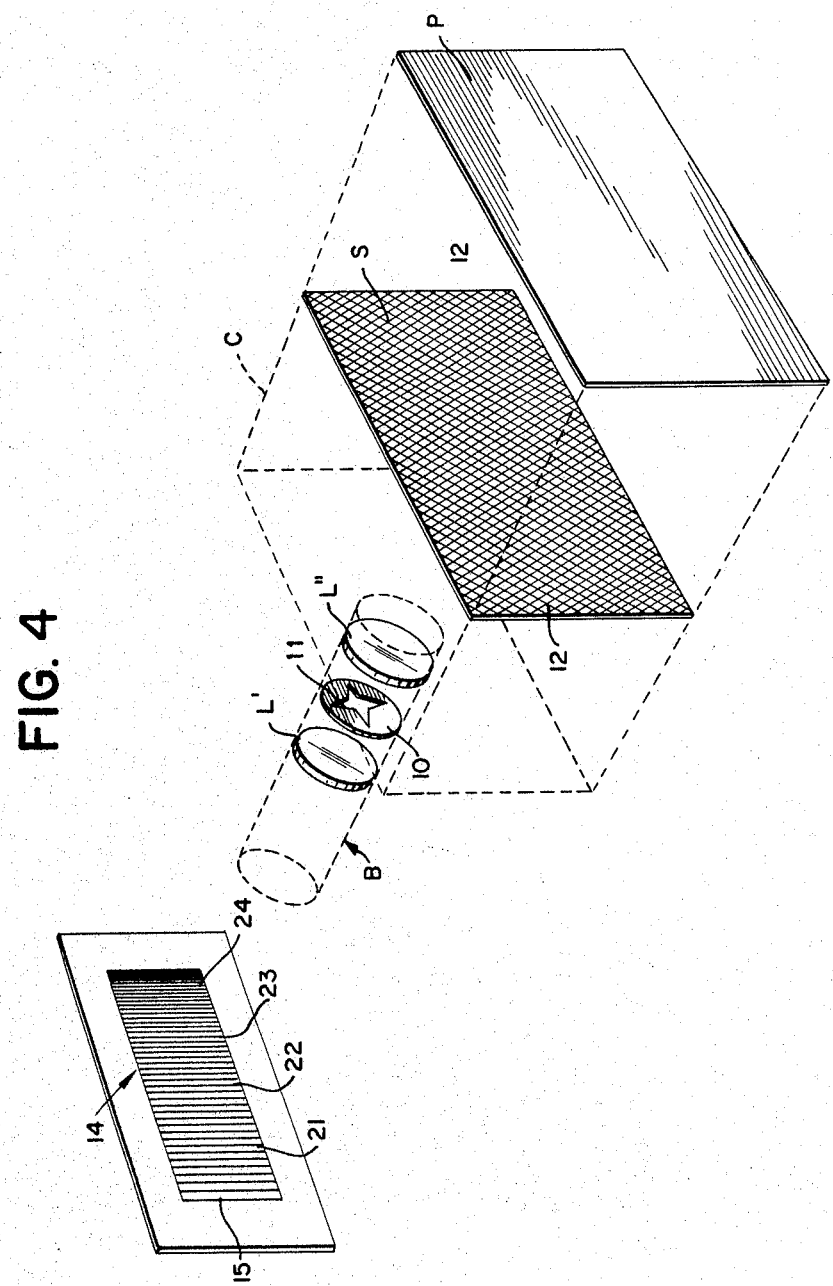

United States Patent Office 3,340,061
Patented Sept. 5, 1967

3,340,061
LENS STOP
Thomas A. F. X. McCarthy, Palisades Park, N.J. 07650
Filed Jan. 23, 1964, Ser. No. 341,831
5 Claims. (Cl. 96—45)

This invention relates to a photographic lens stop for use in process cameras and processes utilizing said lens stop for making half-tone negatives and is based on the diffraction theory of half-tone photography which concludes that the half-tone negative dot is an image of the stop employed produced through each aperture of the half-tone screen.

This application is a continuation-in-part of copending application Ser. No. 839,893, filed Sept. 14, 1959, now abandoned.

The objects of the invention include the provision of a single lens stop having an aperture shaped to produce negative half-tone dots compatible with a much wider range of the tone scale between ligh and dark than heretofore thought possible and which produce highlight tone areas having sharply defined dot separation areas formed with pointed extensions which dissipate in the etching bath of the photo-engraving process, resulting in brighter highlight tones without the necessity of hand tooling.

The invention provides a lens stop having a star shaped aperture having four evenly spaced radially extending points, preferably arranged with the intersecting longitudinal axes of oppositely extending points disposed at angles, forty-five degrees to the axes of the opaque, cross-linear elements of the half-tone screen. The areas of the various portions of the star shaped aperture are such that the bodies of the negative dots formed through the half-tone screen may easily merge in the highlight areas and separate gradually throughout a wide range of the tone scale, while peripheral sharpness and separation of the dots at the dot extensions is well defined in the highlight areas and throughout a wide tone range below the highlight areas.

By using the stop of the invention in the relative position to the screen just described, the area of separation between the dot extensions may be made to assume a definite star shape in the highlight tones, the points of which merge gradually as the tone areas darken and which follow the crossed lines of the opaque screen elements. This produces a cross-grained effect in the reproduction which is highly compatible with quality tone graduation.

The invention and its further advantages will be more fully understood when viewed in the light of the following description and the accompanying drawings, in which:

FIGURE 1 illustrates the star shaped apertured stop of the invention;

FIGURE 2 illustrates the stop of the invention modified for enlargement reproduction;

FIGURE 3 illustrates a tone scale having five values of dark to light;

FIGURE 4 is a diagrammatic illustration showing the relative positioning of the diaphragm in a standard half-tone process camera relative to the tone scale, screen and sensitized plate.

The lens stop of the invention comprises a diaphragm 10 for normal positioning within the lens barrel B of a standard type half-tone process camera C diagrammatically represented in FIG. 4. As is well known in the art, this positioning disposes the diaphragm 10 in back of the forward lens element L' of the usual compound lens (L' and L") employed and between the lens element L' and the half-tone screen S, the latter being disposed in front of the sensitized plate or film P at the rear of the camera C and spaced forwardly therefrom within the standard screen distance adjustment range. The diaphragm 10 is formed with a symmetrical four-pointed star shaped aperture 11, and when used under standard conditions where the half-tone screen cross-lines, indicated at 12 in FIG. 4, extend at angles, forty-five degrees to the horizontal, the longitudinal axes of the aperture point extensions are disposed vertically and horizontally as illustrated in FIG. 1. This angular orientation of the stop aperture relative to the screen results in the light affected by the points of the star aperture falling in the corners of each screen aperture.

A highly enlarged negative showing portions A, B, C and D of the tone scale 14 of FIG. 3 and produced by using the present lens stop would show in the highlight area 15, the body and adjacent portions of the point extensions of black negative dots to have spread and merged in the side areas of the screen apertures formed by the opaque linear elements of the screen. The extreme tips of the point extensions maintain their shape to a limited degree and fall into the corner areas of the screen apertures. The result is that the separation areas in the highlight tone are star shaped and occur at the intersecting areas of the opaque screen elements.

In the intermediate light tone areas 21 and 22, the tipped corners of the negative dots are maintained but dissipate in the low tone areas 23 and 24 where the dots assume round shapes.

A positive reproduction would show the unaffected areas of the negative or the separation areas forming completely separated star shapes in the highlight area. The points of the star shaped separations merge and the bodies and the points spread more and more through the darkening areas until the star shape is lost completely in the darker areas, where for all practical purposes it is not desired.

As the points of the star shaped separation areas, effected by the shape of the lens stop, emanate from the intersecting areas of the screen, a reproduction results having a cross-grained appearance. This is most desirable for tone quality as the points of the star shapes quickly merge when out of the highlight areas giving excellent definition and the transposition into darker tones is more readily perceived all through the tone scale because of the gradual spreading of the star points of the separation areas which continues to the deeper tones.

As already noted, a great benefit of the completely separated star shaped separations in the highlight areas is that the tips of the star points fall away nicely in the etching bath of the photo-engraving process to produce bright highlights with little or no hand tooling of the engraved plate.

In utilizing the invention in a standard process camera having a lens with a nineteen inch focal length, it has been determined that excellent results are achieved with a star shaped aperture measuring one-half of an inch between oppositely extending point extensions indicated at 27 in FIG. 1, and having the distance 28 between the inner ends of the sides of each point measuring one eighth of an inch. The stop shown in FIG. 1 has been drawn to scale from a stop having these measurements and successfully used for practically all types of subjects and applications by varying the exposure time.

For enlargements, the distance between the points may be extended to compensate for diffusion of light over greater distances and may be reduced for reductions. FIG. 2 illustrates a stop 30 drawn to scale from a stop successfully used for enlargement reproductions, the distance 31 between oppositely extending points being three-quarters of an inch, but retaining the square area 32 at the center of the aperture having one-eighth of an inch sides connecting the inner ends of the point extensions.

Preferably, and especially with the screen, the area of the aperture should correspond with the area of the desired $f$ opening and the size of the stop aperture can be varied for each $f$ setting by varying the distance between inner points and outer points proportionately, but keeping the area substantially equal to the area of the normal $f$ setting. A direct proportioning using the measurements given in the preceding paragraph can be used to produce any desired area.

Different measurements for the inner square and point distance may be used under other standard and non-standard conditions. The important thing is to provide a star shaped stop aperture for unequal diffusion of light through the screen aperture allowing quicker spreading of the dot body in the areas of greater light intensity, the body and adjacent portions, than in the areas of least light intensity, the tips of the point extensions. The diffusion should be such that the star shaped separations in the highlight areas are separated.

In contrast with the method of exposing a negative using standard round diaphragm aperture where normally three exposures are made at various $f$:values, for instance, one for highlight areas, one for middle tone areas and one for detail or dark areas, the use of the star shaped aperture of the invention ordinarily necessitates only one exposure. Because of the unequal diffusion of light and consequent "controlled" spreading of the dots, ordinarily a minute to a minute and a half exposure time, according to the subject to be reproduced, is all that is required. Where copy having poor tone quality is the subject for reproduction or where diminution of a particular highlight area is desired, an initial exposure of approximately one to three seconds is given directly to the negative without the half-tone screen in position. Consequently, exposure time required with round apertured stops may be cut drastically. When making negatives for direct use in the photo-engraving process, the exposure time should be lessened in order to further control the spreading of the negative dots.

Various further uses and advantages of the invention will occur to those skilled in the art and the invention is not limited to the specific embodiment herein described. The spirit and scope of the invention are limited only by the following claims.

What is claimed is:

1. In combination with a process camera for making half-tone reproductions having various light tone graduation therein, said camera including a lens barrel, a half-tone screen rearwardly spaced from said lens barrel and forwardly spaced from a light sensitive element upon which the reproduction is made, said screen having two series of parallel lines intersecting each other at 90° angles; a lens stop disposed within said lens barrel, said lens stop comprising a diaphragm formed with a symmetrical star-shaped aperture, the edges of said aperture forming a center area and four evenly spaced and outwardly pointed radial extension areas, a plane extending through opposite points of said radial extension areas extending at 45° angles to the cross-linear elements of said screen, said center area and extension areas defined by said edges of said aperture being so dimensioned so as to consist of means for diffusing light therethrough for effecting diffused half-tone dots upon the light sensitive element through the opening in said screen defined by said opaque elements upon a single exposure only of said light sensitive element to light of highlight tone graduation through said aperture, said dot being substantially round at its periphery in the area of the sides of the opaque linear elements of the screen openings, and being tipped at its periphery in the areas of the corners of the opaque linear elements of the screen openings, whereby star-shaped dot separation areas in the highlight tone areas of said reproduction between said diffused dots are formed, said center area and extension areas further being dimensioned so as to consist of means for effecting such four-pointed star-shaped dot separation areas in the highlight tone areas of said reproduction with the pointed extensions of said separation areas gradually spreadingly merging through the range of middle tone areas in said reproduction, the star shape of said separation areas dissipating in the dark tone areas.

2. The combination of claim 1 wherein the distance between oppositely extending point extensions is one-half of an inch and the distance between the inner ends of the sides of each point measures one-eighth of an inch.

3. The combination of claim 1 wherein the distance between oppositely extending point extensions is three-quarters of an inch and the distance between the inner ends of the sides of each point is one-eighth of an inch.

4. A method of producing a half tone reproduction having separated star shaped dot separations in highlight areas with the star extensions joined and gradually spreadingly merging through the range of middle tone areas and with the star shape of the separations areas dissipating in dark tone areas, in a half tone process camera utilizing a compound lens within a lens barrel at the forward part of the camera disposed in front of a subject of varying tone graduations and utilizing a half tone screen at the rear of the camera disposed in front of a sensitized element, the screen having linear opaque elements intersecting at ninety degree angles, said method comprising positioning within the lens barrel between the lens elements of said compound lens a diaphragm formed with a symmetrical star shaped aperture having a center area and four evenly spaced radial extension areas and dimensioned for and consisting of means for controlling the spreading of the half-tone dot through the screen upon the sensitized element to produce said reproduction upon one single exposure of the subject to the sensitized element therethrough, said radial extensions extending at forty-five degree angles to the cross linear elements of the screen and making only one single exposure of the subject to the sensitized element through said star shaped aperture in said stop and through said screen.

5. The method of claim 4, wherein prior to said single exposure through said stop and screen, an initial exposure of said subject to said sensitized element is made without the stop and screen.

References Cited

UNITED STATES PATENTS

| | | | |
|---|---|---|---|
| 2,596,115 | 5/1952 | Austin | 96—116 |
| 2,767,093 | 10/1956 | Bilhoefer | 96—45 |
| 2,789,905 | 4/1957 | Austin | 96—116 |
| 3,040,644 | 6/1962 | Hearther | 96—45 |

OTHER REFERENCES

Mertle, J. S.: American Photoengraver, 21, 1929, pp. 937–948.

NORMAN G. TORCHIN, *Primary Examiner.*

ALEXANDER D. RICCI, R. H. SMITH,

*Assistant Examiners.*